(12) United States Patent
Hearn

(10) Patent No.: US 11,362,807 B2
(45) Date of Patent: Jun. 14, 2022

(54) SEALED DISTRIBUTED LEDGER SYSTEM

(71) Applicant: R3 Ltd., London (GB)

(72) Inventor: Michael Christopher Hearn, London (GB)

(73) Assignee: R3 LLC, London (GB)

(*) Notice: Subject to any disclaimer, the term of this patent is extended or adjusted under 35 U.S.C. 154(b) by 217 days.

(21) Appl. No.: 16/540,824

(22) Filed: Aug. 14, 2019

(65) Prior Publication Data

US 2021/0050990 A1 Feb. 18, 2021

(51) Int. Cl.
*H04L 9/06* (2006.01)
*G06F 16/23* (2019.01)
*H04L 9/08* (2006.01)
*H04L 9/30* (2006.01)

(52) U.S. Cl.
CPC ........ *H04L 9/0637* (2013.01); *G06F 16/2379* (2019.01); *H04L 9/0819* (2013.01); *H04L 9/3073* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,614,668 B1 | 4/2017 | Simmons et al. | |
| 2009/0037684 A1* | 2/2009 | Obata | G06F 12/0269 711/170 |
| 2009/0113217 A1* | 4/2009 | Dolgunov | H04L 9/0894 713/190 |
| 2017/0124353 A1 | 5/2017 | Arora | |
| 2017/0352012 A1* | 12/2017 | Hearn | G06Q 20/02 |

FOREIGN PATENT DOCUMENTS

| | | |
|---|---|---|
| EP | 3333747 A1 | 6/2018 |
| WO | 2019120327 A2 | 6/2019 |

OTHER PUBLICATIONS

Nakamoto, Satoshi, "Bitcoin: A Peer-to-Peer Electronic Cash System," http://www.bitcoin.org/bitcoin.pdf, pp. 1-9, Jul. 4, 2010.
Hearn, Mike, "Corda: A distributed ledger", Version 0.5, Nov. 29, 2016.
Brown, G., R., et al., "Corda: An Introduction", Aug. 2016.
Anati, I., et al., "Innovative Technology for CPU Based Attestation and Sealing", Aug. 14, 2013, XP055189759, URL:https://software.intel.com/sites/default/files/article/413939/hasp-2013-innovative-technology-for-attestation-and-sealing.

(Continued)

*Primary Examiner* — William J. Goodchild
(74) *Attorney, Agent, or Firm* — Perkins Coie LLP

(57) ABSTRACT

A system for ensuring privacy of transactions is provided. The system may be performed by a computing system during execution of trusted code within a secure enclave of the computing system. The system receives an indication of a transaction. The system validates the transaction. The system encrypts the validated transaction using an encryption key of the trusted code. The system requests untrusted code of the computing system to store the encrypted validated transaction in a portion of a data store. The untrusted code cannot decrypt the encrypted validated transaction that is stored in the data store. Rather, only the trusted code can decrypt the encrypted validated transaction.

23 Claims, 9 Drawing Sheets

(56) References Cited

OTHER PUBLICATIONS

Anonymous "11 Sealing—SGX 10111," Nov. 2, 2018, pp. 1-7, XP055845300, Retrieved from the Internet: URL:https://sgxl01.gitbook.io/sgx101/sgx-bootstrap/sealing.
Brandenburger, M., et al., "Rollback and Forking Detection for Trusted Execution Environments Using Lightweight Collective Memory," 47th Annual IEEE/IFIP International Conference on Dependable Systems and Networks (DSN), IEEE, Jun. 26, 2017, pp. 157-168.
International Search Report and Written Opinion received in Application No. PCT/US21/27216, dated Oct. 8, 2021.
International Search Report and Written Opinion, PCT Patent Application PCT/EP2020/072601, dated Mar. 24, 2021, 22 pages.
New Conclave API, Jan. 28, 2020, URL: https://raw.githubusercontent.com/corda/sgxjvm/master/internal-docs/docs/design/enclave-api.md?token=ABCUDOIE52HRN4EGKBTN3BS6HEJJW.

\* cited by examiner

SEALED DISTRIBUTED LEDGER SYSTEM

BACKGROUND

Distributed ledgers are currently being used in a wide variety of business applications. The bitcoin system is an example of a distributed ledger. The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Blockchains have been developed to support transactions of any type, such as those relating to the sale of vehicles, sale of financial derivatives, sale of stock, payments on contracts, and so on. Such transactions use identity tokens to uniquely identify something that can be owned or can own other things. An identity token for a physical or digital asset is generated using a cryptographic one-way hash of information that uniquely identifies the asset. Tokens also have an owner that uses an additional public/private keypair. The owner public key or hash of the owner public key is set as the token owner identity, and when performing actions against tokens, ownership proof is established by providing a signature generated by the owner private key and validated against the public key or hash of the public key listed as the owner of the token. A person can be uniquely identified, for example, using a combination of a user name, social security number, and biometric (e.g., fingerprint). The creation of an identity token for an asset in a blockchain establishes provenance of the asset, and the identity token can be used in transactions (e.g., buying, selling, or insuring) involving the asset stored in a blockchain, creating a full audit trail of the transactions.

To enable more complex transactions than bitcoin can support, some systems use "smart contracts." A smart contract is a decentralized computer program that comprises code and a state. A smart contract can perform virtually any type of processing such as sending money, accessing external databases and services (e.g., oracles), and so on. A smart contract may be executed in a secure platform (e.g., the Ethereum platform, which provides a virtual machine) that supports recording transactions in a blockchain. The smart contract code itself may be recorded as a transaction in the blockchain using an identity token that is a hash of the smart contract code so that it can be authenticated. When the smart contract deployed, a constructor of the smart contract executes, initializing the smart contract and its state. In Ethereum, a smart contract is associated with a contract account. There are two types of accounts in Ethereum: externally owned accounts ("EOA"), which are controlled by private keys, and contract accounts, which are controlled by computer code. Accounts contain the following fields: a balance, code (if present), and a storage (empty by default). The code of a smart contract is stored as the code in a contract account, and the state of the smart contract is stored in the contract account's storage, which the code can read from and write to. An EOA has no code and does not need a storage, so those two fields are empty in an EOA. Accounts have a state. The state of an EOA comprises only a balance, whereas the state of a contract account comprises both a balance and a storage. The states of all accounts are the state of the Ethereum network, which is updated with every block and about which the network needs to reach a consensus. An EOA can send transactions to other accounts by signing the transactions with the private key of the EOA account. A transaction is a signed data package that contains a message to be sent from an EOA to the recipient account identified in the transaction. Like an EOA, a contract account, under control of its code, can also send messages to other accounts. However, a contract account can send messages only in response to transactions that it has received. Therefore, all action in the Ethereum blockchain is triggered by transactions sent from EOAs. A message sent by a contract account differs from a transaction sent by an EOA in that a message sent by a contract account does not include a cryptographic signature since a contract account is not controlled by a private key. When a contract account receives a message, every mining node that maintains a replica of the blockchain executes the code of the contract account as part of the block validation process. So if a transaction is added into a block, all nodes that validate the block execute the code whose execution is triggered by that transaction. Although the execution of the computer code at each node helps ensure the authenticity of the blockchain, large amounts of computer resources are required to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node, for notarization. The notary maintains a UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties. Aspects of the Corda system are described in U.S. patent application Ser. No. 15/364,213 filed on Nov. 29, 2016 and entitled "Secure Processing of Electronic Transaction by a Decentralized, Distributed Ledger System," which is hereby incorporated by reference.

DETAILED DESCRIPTION

Figure 1:
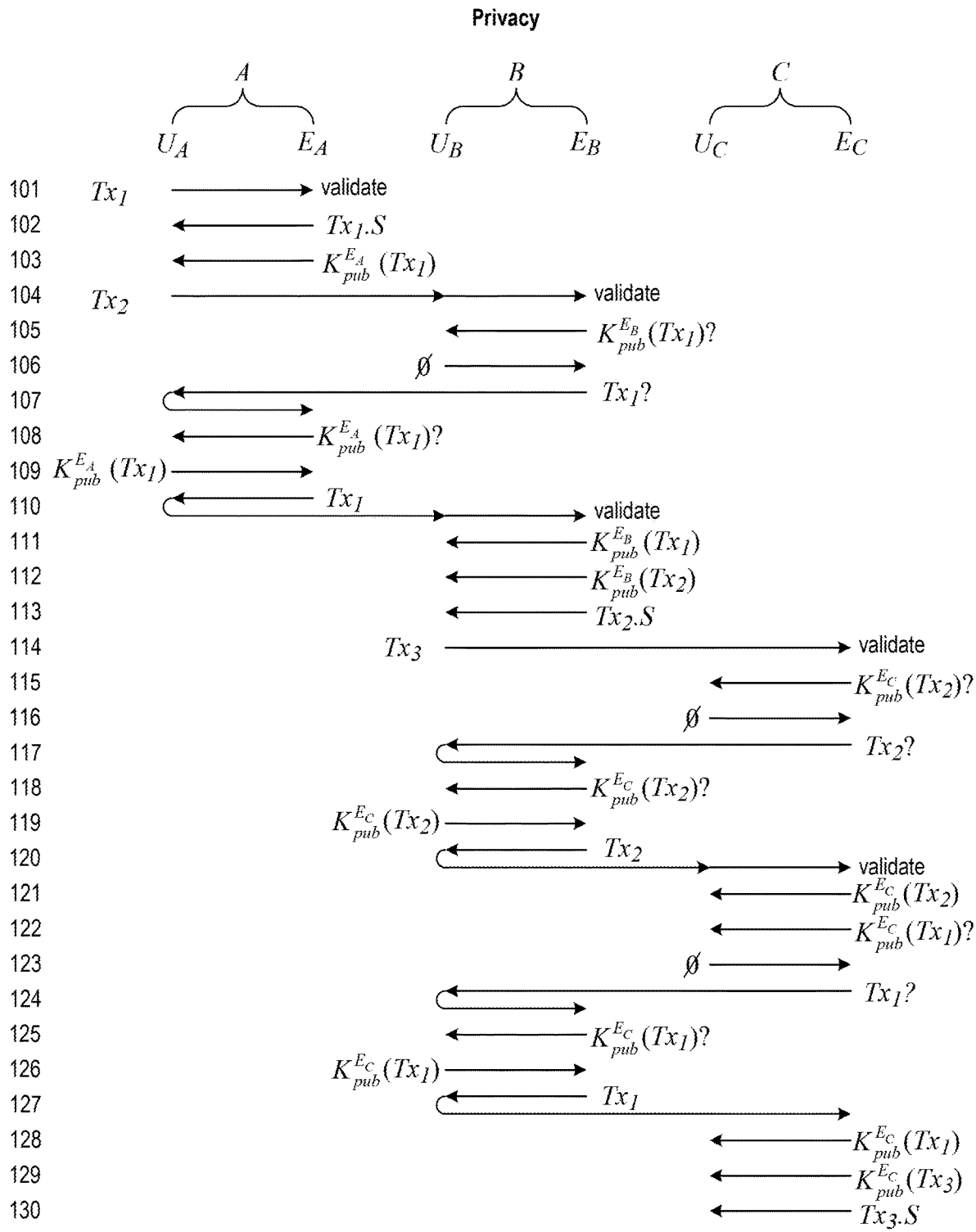
FIG. 1 is a diagram that illustrates storing transactions in a sealed distributed ledger in a way that ensures the privacy of transactions in some embodiments.

A sealed distributed ledger ("SDL") system supports the storing of encrypted transactions of a distributed ledger in a "sealed" distributed ledger to ensure privacy of transactions. The use of an SDL is referred to as a privacy model of storage, because entities that are not participants in a transaction will have access only to the output state ("state") of that transaction. Each node of the distributed ledger may maintain a sealed portion of the SDL whose transactions are accessible only by trusted code of a secure enclave ("enclave") of that node and thus considered to be "sealed." The transactions stored in each sealed portion are encrypted with an encryption key (e.g., public key) and can only be decrypted with a decryption key (e.g., private key) of the enclave of the node that stores that sealed portion. The enclaves execute validation code to validate transactions stored in the SDL. When validating a transaction, an enclave may interact with a notary node to ensure that the input state of the transaction has not been consumed and to notarize the transaction. Each node of an entity authorized to access a transaction (e.g., a participant to that transaction) may also store that transaction in a portion of the distributed ledger that is not sealed. The nodes that store portions of the SDL may be notary nodes or non-notary nodes.

To validate a transaction, untrusted code of a node executing outside the enclave of that node provides that transaction to the enclave. Trusted code and untrusted code refer to code that executes within the enclave and outside of the enclave, respectively. As part of the validation process, the enclave of that node may require access to ancestor transactions. If an ancestor transaction is stored in the SDL portion of that node, the enclave can retrieve the encrypted ancestor transaction from its SDL portion, decrypt the ancestor transaction, and use the ancestor transaction to validate the transaction. Otherwise, the enclave requests the ancestor transaction from another enclave of another node (e.g., of a participant in the transaction) that stores the ancestor transaction in its SDL portion. The other enclave retrieves the ancestor transaction from its SDL portion, decrypts the ancestor transaction, and sends the decrypted ancestor transaction via a secure channel to the requesting enclave. When the requesting enclave receives the ancestor transaction, it uses the ancestor transaction to validate the transaction. The enclave may then encrypt the ancestor transaction and store the encrypted transaction in its SDL portion in case the enclave needs the ancestor transaction, for example, for validating another transaction, auditing purposes, or responding to requests for the transaction from another enclave.

Because ancestor transactions needed for validating are decrypted only while being processed by an enclave, untrusted code will not have access to a decrypted ancestor transaction (except for those transactions in which the node was a participant). The untrusted code will thus have access only to the state of a transaction to which it was a participant or authorized by a participant. This helps ensure the privacy of transactions because only the participants of a transaction have (and can authorize other entities to have) access to that transaction.

In some embodiments, code of the enclave is executed by a Java Virtual Machine ("JVM"). The JVM may be adapted to improve security of and to facilitate development of code to execute securely in the enclave. The JVM may be adapted to, for example, obscure memory access patterns and obscure message sizes to help prevent side-channel attacks.

In some embodiments, the JVM may provide application programming interfaces and components to facilitate implementation of enclave code. For example, an application programming interface may be provided to establish a secure communications channel between enclaves as described in the following.

In some embodiments, to obscure memory access patterns, the garbage collector of a JVM may be modified to execute a component that, when an obscure memory access criterion (e.g., periodically or at randomized times) is satisfied, rearranges objects (or more generally data) stored in memory locations to move them from their current memory to a new memory location. When trusted code accesses an object after the rearranging, the accesses will be directed to the object's new memory location. The trusted code may use trusted code references that are not actual memory addresses, and the JVM may maintain a translation table that maps those trusted code references to JVM references (e.g., virtual addresses), which in turn reference physical addresses. The component may adjust the JVM reference to the new memory locations. Because of this rearranging, the memory access patterns to access physical memory will change from time to time to obscure the patterns of access to the data by the trusted code. Because of the obscuring of the memory access patterns, malware executing as untrusted code will have more difficulty in inferring information when monitoring accesses to physical memory. The component may also be used by services of the JVM other than the garbage collector, such as communication services, application programming interfaces, and so on. These services may be adapted when started (e.g., called) to invoke the component to perform the obscuring. When a service is started, it can determine whether to rearrange the objects at that time based on an obscure memory access criterion.

In some embodiments, to obscure message sizes, a send message component of the JVM may be modified to modify message sizes in a randomized manner. The component may increase a message size or split a message into multiple messages. When increasing message sizes, the component may increase a message size up to a maximum message size. The maximum message size may be derived from the message size of a large message that is sent. The component may fill the increased portion of the message with random data. If a large message size is larger than the maximum message size, the component may increase the maximum size to be at least the large message size. If such a large message size is an aberration, then increasing the maximum message size may result in a significant increase in communication bandwidth consumption. To help reduce the consumption, the component may reduce the maximum message size if recently sent messages are smaller by a threshold amount (e.g., 50%). The component may gradually reduce the maximum message size based on a second-largest message size of a recent message using a hysteresis-type process. When splitting a message into multiple messages, each of the multiple messages may also have its size increased as described above. When a receive message component receives a message with an increased message size, it may set the message size to the original message size and provide the message to the trusted code. Similarly, when a receive message component receives multiple messages of a split message, it may combine the message into the original split message.

FIG. 1 is a diagram that illustrates storing transactions in a sealed distributed ledger in a way that ensures the privacy of transactions in some embodiments. Untrusted code $U_A$, untrusted code $U_B$, and untrusted code $U_C$ refer to untrusted code of node A, node B, and node C, respectively, that executes outside of an enclave. Enclave $E_A$, enclave $E_B$, and enclave $E_C$ refer to the trusted code of node A, node B, and node C, respectively, that executes inside of an enclave. Sealed distributed ledger $SDL_A$ (not shown) of node A stores transactions encrypted with public key $K_{pub}^{E_A}$ of enclave $E_A$, sealed distributed ledger $SDL_B$ of node B stores transactions encrypted with public key $K_{pub}^{E_B}$ of enclave $E_B$, and sealed distributed ledger $SDL_C$ of node C stores transactions encrypted with public key $K_{pub}^{E_C}$ of enclave $E_C$.

Initially, untrusted code $U_A$ and untrusted code $U_B$ establish a secure communications channel for securely exchanging messages using, for example, a symmetric key created using a Diffie-Hellman key exchange. The untrusted code then directs their enclaves to perform (as described in FIG. 2) an attestation process to ensure that both enclaves are executing the trusted code. In addition, enclave $E_A$ and enclave $E_B$ also establish a secure communications channel for exchanging messages.

Steps 101-103 illustrate node A issuing transaction $Tx_1$. In step 101, untrusted code $U_A$ sends transaction $Tx_1$ to enclave $E_A$ for validation. As part of the validation processing, enclave $E_A$ may ask a notary node to notarize the transaction. After validation, in steps 102 and 103, the enclave $E_A$ sends (output) state $Tx_1.S$ of transaction $TX_1$ and encrypted transaction $K_{pub}^{E_A}(Tx_1)$ to untrusted code $U_A$. Untrusted code $U_A$ stores the encrypted transaction $K_{pub}^{E_A}(Tx_1)$ in sealed distributed ledger $SDL_A$ and separately stores state $Tx_1.S$.

Steps 104-113 illustrate the validation of transaction $Tx_2$. In step 104, untrusted code $U_A$ sends the (proposed) transaction $Tx_2$ to untrusted code $U_B$, which sends transaction $Tx_2$ to enclave $E_B$ for validation. In step 105, enclave $E_B$ determines that the validation requires transaction $Tx_1$ and sends a request $K_{pub}^{E_B}(Tx_1)?$ to untrusted code $U_B$. Untrusted code $U_B$ determines that encrypted transaction $Tx_{pub}^{E_B}(Tx_1)$ is not stored in $SDL_B$. In step 106, untrusted code $U_B$ sends to enclave $E_B$ an indication that the requested encrypted transaction was not found. Since encrypted transaction $K_{pub}^{E_B}(Tx_1)$ was not found, enclave $E_B$ requests that transaction from the enclave of the node that sent (proposed) transaction $Tx_2$. To request that transaction, enclave $E_B$ establishes a secure communication channel with enclave $E_A$ as described in FIG. 2. Once a secure communication channel is established, in step 107, enclave $E_B$ sends to enclave $E_A$ via the secure communication channel a request $Tx_1?$ for transaction $Tx_1$. The request is routed through untrusted code $U_A$ to enclave $E_A$. In step 108, enclave $E_A$ sends a request $K_{pub}^{E_A}(Tx_1)?$ to untrusted code $U_A$. In step 109, untrusted code $U_A$ retrieves $K_{pub}^{E_A}(Tx_1)$ from distributed ledger $SDL_A$ (stored in step 103) and sends it to enclave $E_A$. In step 110, enclave $E_A$ decrypts transaction $Tx_1$ using private key $K_{pub}^{E_A}$ and sends transaction $Tx_1$ to enclave $E_B$ via the secure channel through untrusted code $U_A$ and untrusted code $U_B$. Although the transaction is decrypted using private key $K_{priv}^{E_A}$, since enclave $E_A$ and enclave $E_B$ communicate via a secure communication channel, the untrusted code will not have access to a decrypted version of transaction $Tx_1$. In steps 111-113, enclave $E_B$ completes the validation of transaction $Tx_2$ and sends $K_{pub}^{E_B}(TX_1)$ and $K_{pub}^{E_B}(Tx_2)$ to untrusted code $U_B$ for storing in sealed distributed ledger $SDL_B$ and sends state $Tx_2.S$ to untrusted code $U_B$ for storing separately.

Steps 114-130 illustrate the validation of transaction $Tx_3$. Steps 114-121 are similar to steps 104-111 except that node C, as part of validating transaction $Tx_3$, retrieves transaction $Tx_2$ from node B rather than node B, as part of validating transaction $Tx_2$, retrieving transaction $Tx_1$ from node A. Since transaction $Tx_2$ has ancestor transaction $Tx_1$, steps 122-128 are similar to steps 114-121 except for retrieving transaction $Tx_1$ rather than retrieving transaction $Tx_2$. If node B had not stored transaction $Tx_1$ in sealed distributed ledger $SDL_B$ in step 111, then node B would need to retrieve transaction $Tx_1$ from node A in a manner similar to steps

107-110. In steps 129 and 130, enclave $E_C$ sends $K_{pub}^{E_C}$ (Tx$_3$) to untrusted code $U_C$ for storing in sealed distributed ledger SDL$_C$ and sends state Tx$_3$.S to untrusted code $U_C$ for storing separately.

Figure 2:
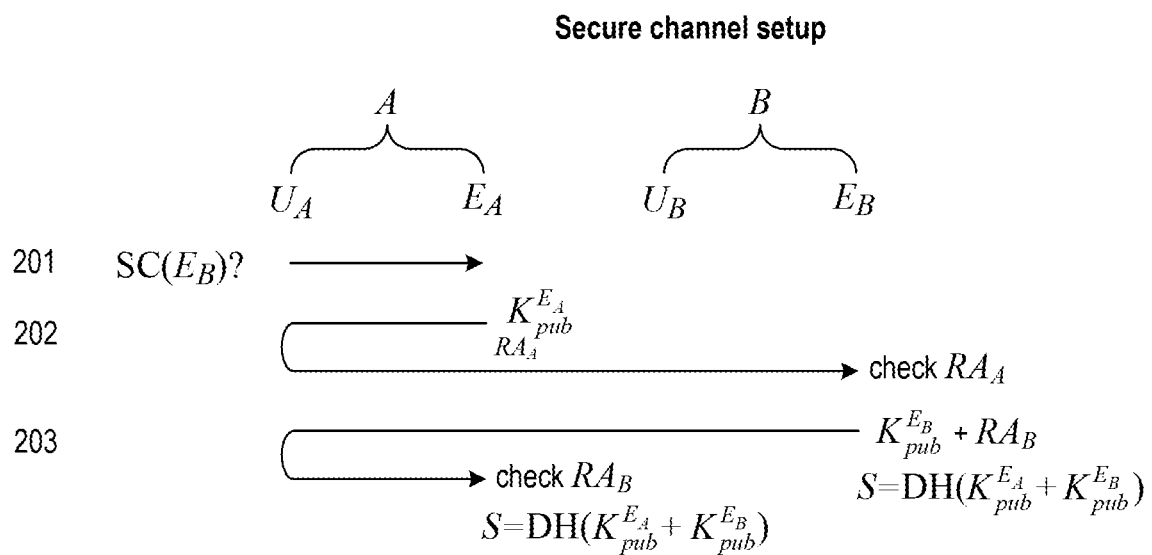
FIG. 2 is a diagram that illustrates an attestation process and establishment of a secure communications channel in some embodiments.

FIG. 2 is a diagram that illustrates an attestation process and establishment of a secure communications channel in some embodiments. Node A requests that a secure communication channel be established between enclave $E_A$ and enclave $E_B$, for example, to send an ancestor transaction for use in validation. In step 201, untrusted code $U_A$ sends a request SC(E$_B$?) to enclave $E_A$ to establish a secure communication channel with enclave $E_B$. In step 202, enclave $E_A$ generates a public/private keypair $K_{pub}^{E_A}$ and $K_{priv}^{E_A}$ and remote attestation RA$_A$. The remote attestation RA$_A$ includes a hash of the code of enclave $E_A$ signed using a private key $K_{priv}^{CPU_A}$ assigned to CPU$_A$ of node A during manufacture of CPU$_A$ so that a receiving party can confirm that the enclave $E_A$ is executing the expected code. The receiving party can verify the signature using the public key $K_{pub}^{CPU_A}$ that is provided by the manufacturer (e.g., Intel Corporation). Enclave $E_A$ sends the public key $K_{pub}^{E_A}$ and remote attestation RA$_A$ to enclave $E_B$ via untrusted code $U_A$. Enclave $E_B$ checks the remote attestation RA$_A$ to ensure that enclave $E_A$ is executing the expected code. If it is, enclave $E_B$ generates a public/private keypair $K_{pub}^{E_B}$ and $K_{priv}^{E_B}$ and remote attestation RA$_B$. Enclave $E_B$ generates a symmetric key SK based on a Diffie-Hellman algorithm applied to public key $K_{pub}^{E_A}$ and public key $K_{pub}^{E_B}$. Enclave $E_B$ encrypts messages to be sent to enclave $E_A$ and decrypts messages received from enclave $E_A$ using symmetric key SK. In step 203, enclave $E_B$ sends public key $K_{pub}^{E_B}$ and remote attestation RA$_B$ signed with private key $K_{priv}^{CPU_B}$ of Node B to enclave $E_A$ via untrusted code $U_A$. Upon receiving them, enclave $E_A$ checks the remote attestation RA$_B$ and its signature using public key $K_{pub}^{CPU_B}$ to ensure that enclave $E_B$ is executing the expected code. If it is, enclave $E_A$ also generates the symmetric key SK based on a Diffie-Hellman algorithm applied to public key $K_{pub}^{E_A}$ and public key $K_{pub}^{E_B}$. Enclave $E_A$ encrypts messages to be sent to enclave $E_B$ and decrypts messages received from enclave $E_B$ using symmetric key SK. The encrypting of messages sent between enclave $E_A$ and enclave $E_B$ using symmetric key SK establishes the secure communications channel.

In some embodiments, a secure enclave refers to a feature of a central processing unit ("CPU") in which code and data of code (i.e., trusted code) are stored in memory in encrypted form and decrypted only when retrieved for use by the CPU. Such code is said to execute in the secure enclave. The CPU supports generating an attestation of the trusted code that executes in the secure enclave. The attestation includes a hash of the trusted code, an identifier of the CPU, and application data. The attestation is encrypted or signed by a CPU private key of a CPU public/private keypair that is stored in the CPU during manufacture of the CPU. The trusted code requests the CPU to provide the attestation and then provides the attestation to client code as evidence of the trusted code that executes in the secure enclave. The client code can request a service of the manufacturer of the CPU to provide the CPU public key of the CPU public/private keypair to decrypt or verify the signature. The client code can extract the hash to verify that the trusted code is the expected code and extract the application data. Such a secure enclave is provided by the Software Guard Extensions ("SGX") feature provided by Intel Corporation.

Figure 3:
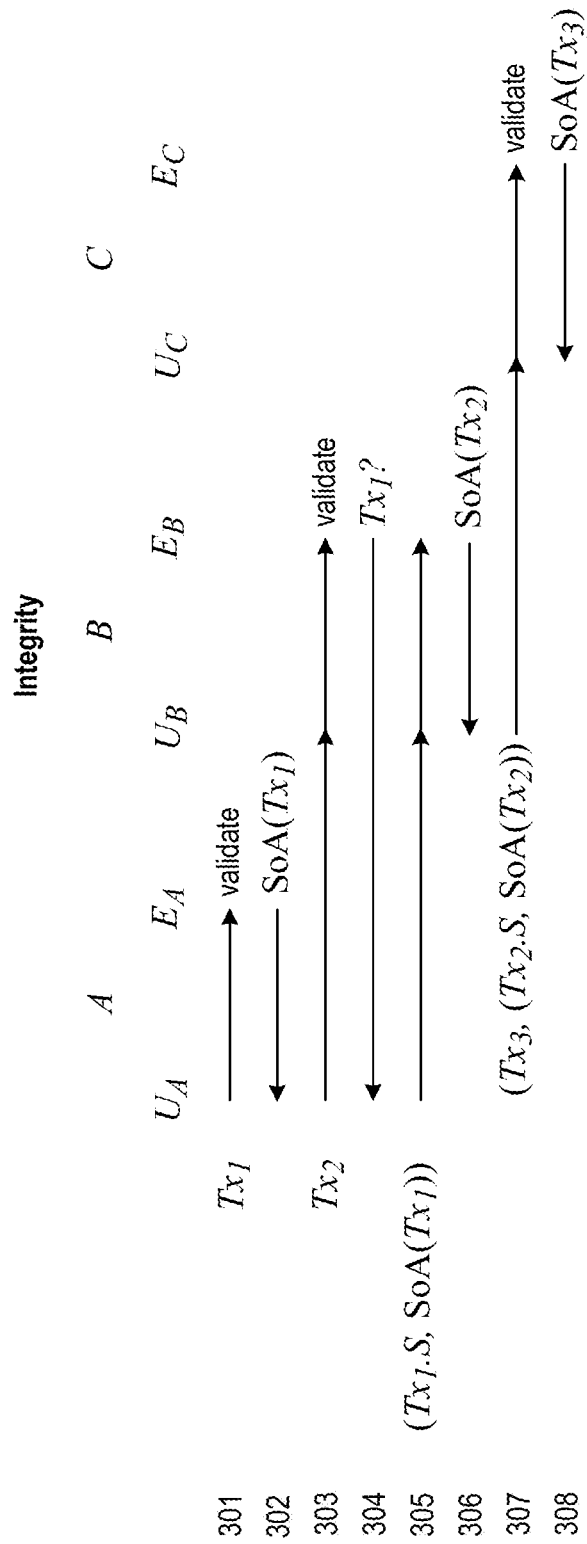
FIG. 3 is a diagram that illustrates validation of transactions without having to send ancestor transactions to validating enclaves in some embodiments.

FIG. 3 is a diagram that illustrates validation of transactions without having to send ancestor transactions to validating enclaves in some embodiments. When validating a transaction, an enclave can rely on a signature of attestation ("SoA") for an immediate ancestor transaction provided by another enclave as evidence that the immediate ancestor transaction is valid. If the immediate ancestor transaction is valid, then all ancestor transactions of that immediate ancestor transaction can be assumed to also be valid. The SoA for a transaction includes the remote attestation of the attesting enclave and the state of the transaction. The remote attestation may include a hash of the trusted code and a hash of the transaction. The hash may be used to identify the transaction that is attested to as being valid.

In step 301, untrusted code $U_A$ sends transaction Tx$_1$ to enclave $E_A$ for validation. In this example, transaction Tx$_1$ does not require any input state, and enclave $E_A$ can thus validate transaction Tx$_1$ without requiring information about an ancestor transaction. Enclave $E_A$ also requests a notary to notarize transaction Tx$_1$; the notary stores a hash of each transaction that it notarizes and marks input states of the transactions as being consumed. In step 302, after validating transaction Tx$_1$, enclave $E_A$ generates the signature of attestation SoA(Tx$_1$) and sends the signature of attestation SoA (Tx$_1$) to untrusted code $U_A$, which stores the signature of attestation SoA(Tx$_1$) for use in validating a transaction that inputs state of transaction Tx$_1$. Although not illustrated, enclave $E_A$ may also send $K_{pub}^{E_A}$(Tx$_1$) to untrusted code $U_A$ for storing in sealed distributed ledger SDL$_A$.

In step 303, untrusted code $U_A$ sends proposed transaction Tx$_2$ to untrusted code $U_B$, which sends transaction Tx$_2$ to enclave $E_B$ for validation. In step 304, enclave $E_B$ requests transaction Tx$_1$? from untrusted code $U_A$. In step 305, untrusted code $U_A$ sends signature of attestation SoA(Tx$_1$) and state Tx$_1$.S to enclave $E_B$. Enclave $E_B$ checks the remote attestation RA$_A$ of signature of attestation SoA(Tx$_1$) to ensure that enclave $E_A$ was executing the expected code when the signature of attestation SoA(Tx$_1$) was generated and retrieves the hash of transaction Tx$_1$. Enclave $E_B$ may then send the hash of transaction Tx$_1$ and state Tx$_1$.S to a notary to ensure that state Tx$_1$.S has not been consumed. Enclave $E_B$ need not validate (or even have access to) transaction Tx$_1$ because it can rely on the signature of attestation SoA(Tx$_1$) as evidence that the transaction identified by the hash is valid. In step 306, enclave $E_B$ generates and sends signature of attestation SoA (Tx$_2$) to untrusted code $U_B$. Although not illustrated, enclave $E_B$ may also send $K_{pub}^{E_B}$(Tx$_2$) to untrusted code $U_B$ for storing in sealed distributed ledger SDL$_B$.

In step 307, untrusted code $U_B$ sends proposed transaction Tx$_3$ to untrusted code $U_C$. In this example, the untrusted code $U_B$ also sends signature of attestation SoA(Tx$_2$) and state Tx$_2$.S to untrusted code $U_C$ to avoid the need to have them separately requested. To validate transaction Tx$_3$, untrusted code $U_C$ sends transaction Tx$_3$, signature of attestation SoA(Tx$_2$), and state Tx$_2$.S to enclave $E_C$. Enclave $E_C$ validates transaction Tx$_3$ in a manner similar to the way enclave $E_B$ validated transaction Tx$_2$. Enclave $E_C$, however, does not need to check whether transaction Tx$_1$ is valid because it can rely on signature of attestation SoA(Tx$_2$) as evidence that all ancestor transactions of transaction Tx$_2$ are valid. In step 308, enclave $E_C$ generates and sends signature of attestation SoA(Tx$_3$) to untrusted code $U_C$. Although not illustrated, enclave $E_C$ may also send $K_{pub}^{E_C}$(Tx$_3$) to untrusted code $U_C$ for storing in sealed distributed ledger SDL$_C$.

Figure 4:
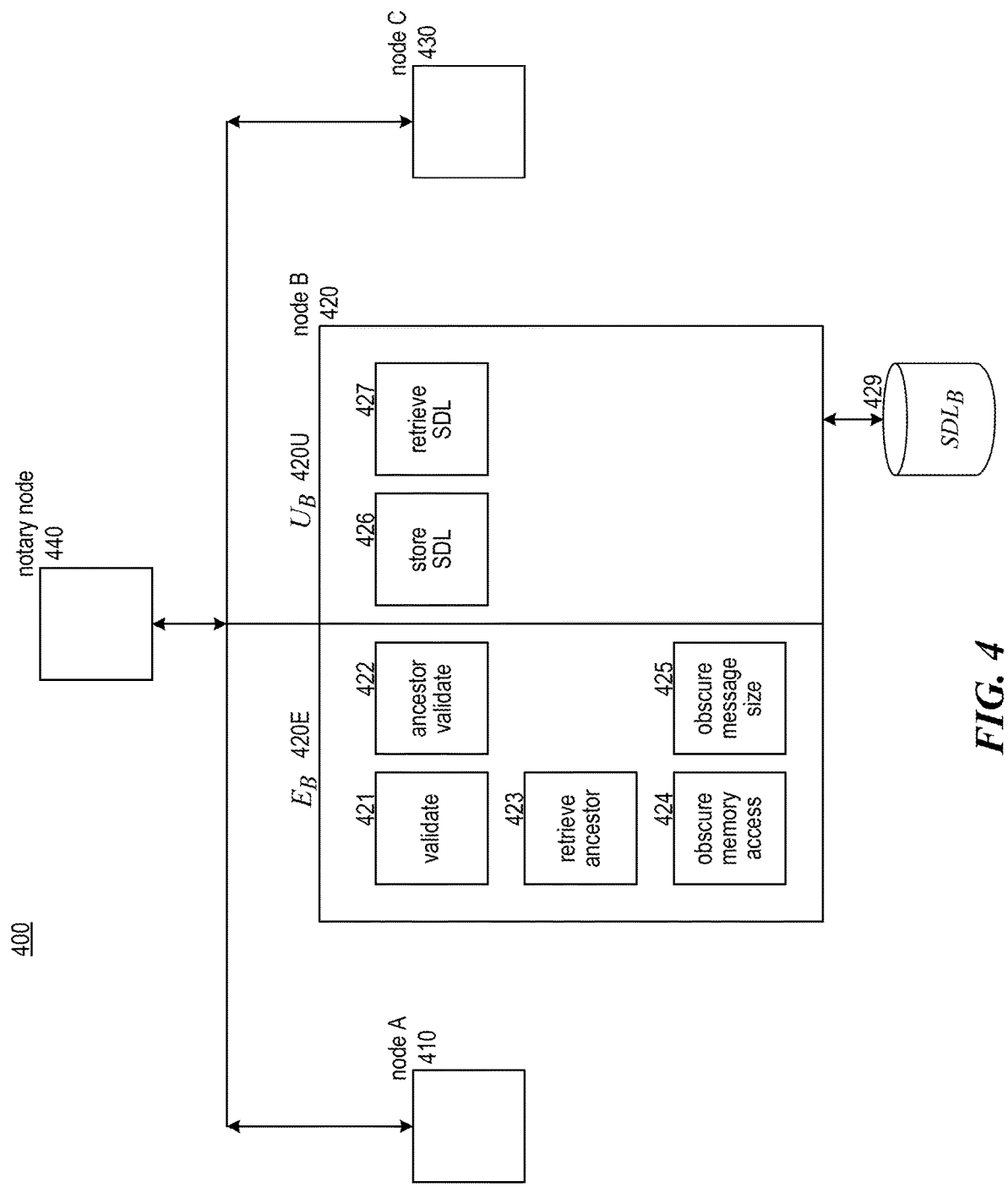
FIG. 4 is a block diagram that illustrates components of an SDL system in some embodiments.

FIG. 4 is a block diagram that illustrates components of an SDL system in some embodiments. The SDL system 400 includes SDL nodes 410, 420, and 430 and notary node 440. The SDL nodes each include a portion of a shared distributed ledger. The SDL nodes may propose transactions, validate transactions, and store validated transactions in an SDL portion. The components of SDL node 420 are illustrated. The other SDL nodes have similar components. SDL node 420 includes secure enclave code 420E and untrusted code 420U.

The secure enclave code includes a validate component 421, an ancestor validate component 422, a retrieve ancestor component 423, an obscure memory access component 424, and an obscure message size component 425. The validate component performs a validation of a transaction by executing smart contract code of the transaction, ensuring that any ancestor transactions are also valid and ensuring that any input states have not been consumed. The ancestor validate component determines whether an ancestor transaction is valid. An ancestor transaction is valid if its smart contract code indicates that it is valid and its ancestor transactions are valid. The retrieve ancestor component retrieves an ancestor transaction that may be stored in an SDL portion stored at a node 420 and, if such ancestor transaction is not stored, retrieves an ancestor transaction from another node. The obscure memory access component reorganizes memory of the secure enclave at various times to help prevent side-channel attacks based on memory access patterns. The obscure message size component adjusts the sizes of messages sent by the enclave code to help prevent side-channel attacks based on message sizes.

The untrusted code includes a store SDL component 426 and a retrieve SDL component 427, which access SDL portion 429. When requested by the enclave, the untrusted code invokes the store SDL component to store encrypted transactions in the SDL portion and invokes the retrieve SDL component to retrieve encrypted transactions from the SDL portion.

The enclave code and the untrusted code include various other components that are not illustrated. For example, the enclave code includes a component to establish a secure connection with another enclave. As another example, the untrusted code may include code for proposing transactions, a component to respond to requests for ancestor transactions stored in the SDL portion, and so on.

The computing systems (e.g., nodes) on which the SDL system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the SDL system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The SDL system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the SDL system may be implemented in hardware using, for example, an application-specific integrated circuit (ASIC) or field programmable gate array ("FPGA").

Figure 5:
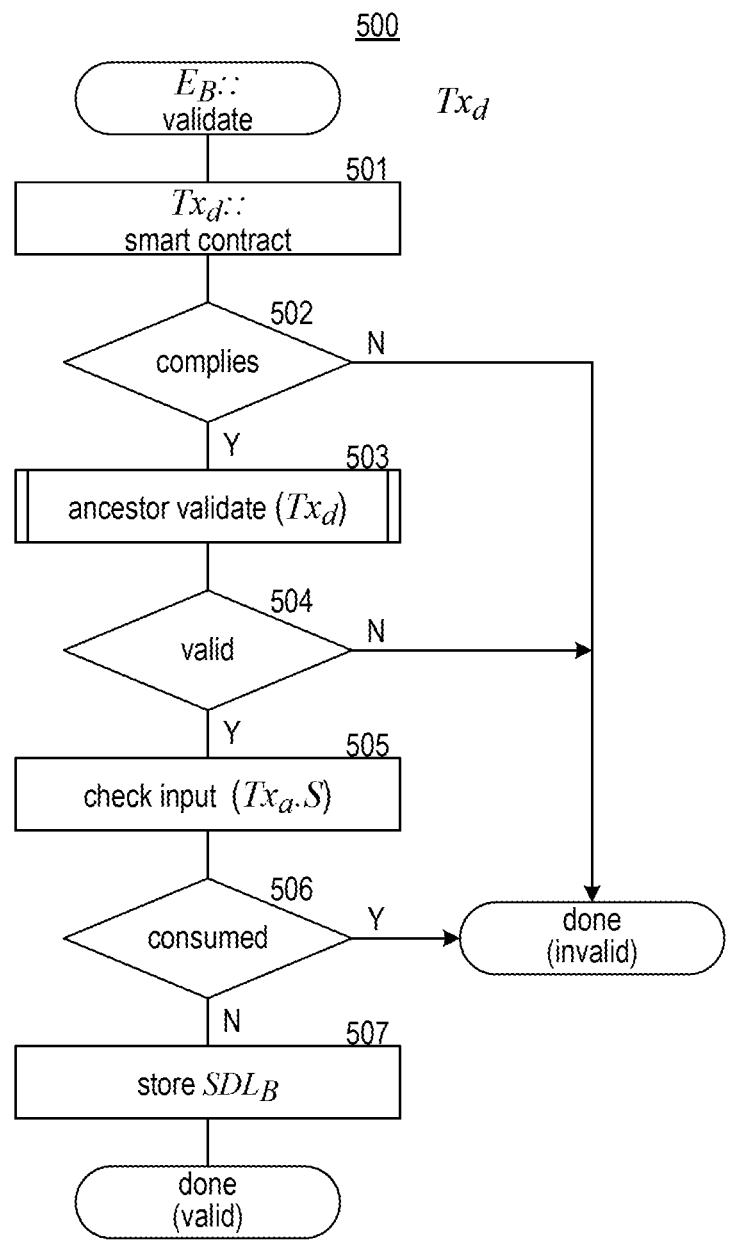
FIG. 5 is a flow diagram that illustrates the processing of a validate component of enclave code in some embodiments.

FIG. 5 is a flow diagram that illustrates the processing of a validate component of enclave code in some embodiments. The validate component 500 is invoked passing an indication of a descendent transaction $Tx_d$ and returns an indication as to whether the transaction is valid. In block 501, the component invokes a smart contract of the descendent transaction $Tx_d$ to determine whether the transaction complies with the terms of the smart contract. In decision block 502, if the smart contract indicates that the descendent transaction complies, then the component continues at block 503, else the component completes, indicating that the descendent transaction is invalid. In block 503, the component invokes the ancestor validate component passing an indication of the descendent transaction. In decision block 504, if the ancestor transaction is valid, then the component continues at block 505, else the component completes, indicating that the descendent transaction is invalid. In block 505, the component requests the notary to check whether the input states of the descendent transaction $Tx_d.S$ have been consumed. In decision block 506, if the inputs have been consumed, then the component completes, indicating that the descendent transaction is invalid, else the component continues at block 507. In block 507, the component requests the untrusted code to store the encrypted descendent transaction in the SDL portion. The component then completes, indicating that the descendent transaction is valid.

Figure 6:
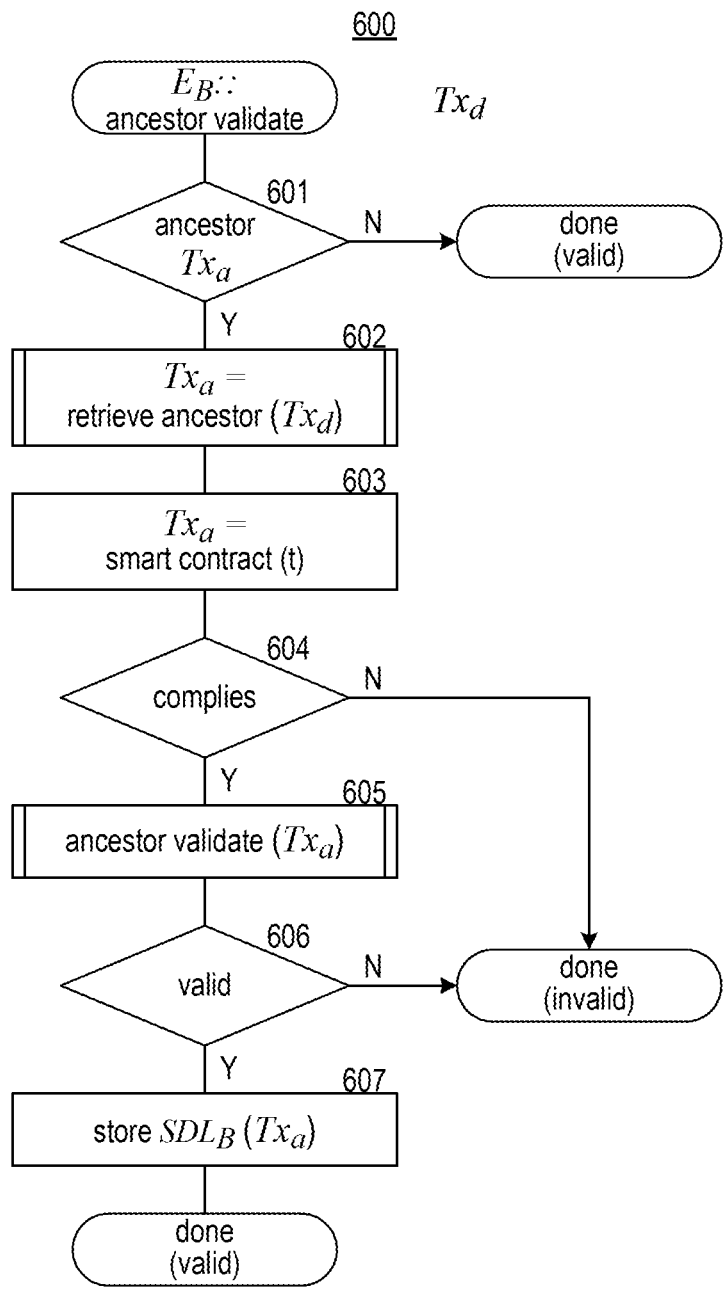
FIG. 6 is a flow diagram that illustrates processing of an ancestor validate component of enclave code in some embodiments.

FIG. 6 is a flow diagram that illustrates processing of an ancestor validate component of enclave code in some embodiments. The ancestor validate component 600 is passed an indication of a descendent transaction and determines whether the ancestor transactions, if any, are valid. The ancestor validate component as illustrated assumes that a transaction has only one immediate ancestor transaction. If a transaction has multiple immediate ancestor transactions, then similar processing would be performed for each immediate ancestor transaction. In decision block 601, if there is an ancestor transaction, the component continues at block 602, else the component completes, indicating that any ancestor transaction is valid. In block 602, the component invokes the retrieve ancestor component, passing an indication of the descendent transaction and receiving the ancestor transaction. The ancestor transaction is encrypted with the public key of the enclave if the ancestor transaction is stored in the local SDL portion. Otherwise, the ancestor transaction is provided by another enclave via a secure communications channel. In block 603, the component invokes the smart contract of the ancestor transaction to determine whether the ancestor transaction complies with the smart contract. In decision block 604, if the ancestor transaction complies, then the component continues at block 605, else the component returns an indication that the ancestor transaction is invalid. In block 605, the component invokes the ancestor validate component recursively passing an indication of the ancestor transaction to determine whether its ancestor transaction is valid. In decision block 606, if its ancestor transaction is valid, then the component continues at block 607, else the component completes, indicating that the ancestor transaction is invalid. In block 607, the component stores the ancestor transaction in the local SDL portion and completes, indicating that the ancestor transaction is valid.

Figure 7:
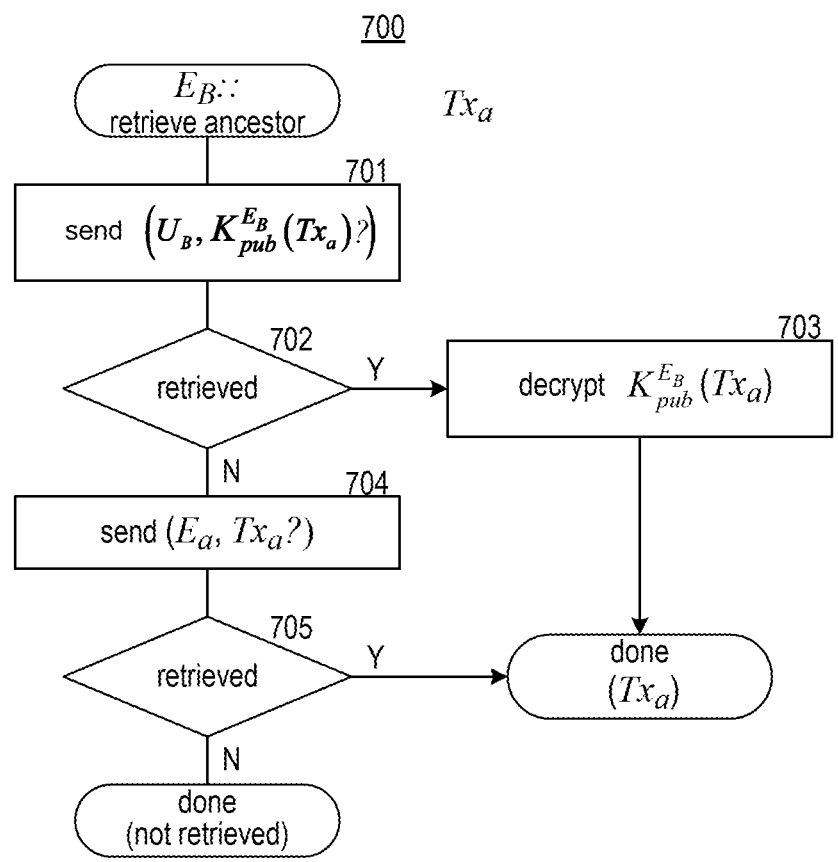
FIG. 7 is a flow diagram that illustrates the processing of a retrieve ancestor component of enclave code in some embodiments.

FIG. 7 is a flow diagram that illustrates the processing of a retrieve ancestor component of enclave code in some embodiments. The retrieve ancestor component 700 is invoked, passing an indication of an ancestor transaction, and retrieves the ancestor transaction either from the local SDL portion and, if the ancestor transaction is not stored there, from another enclave. In block 701, the component sends to the untrusted code of the local node a request to retrieve the encrypted ancestor transaction stored in the local SDL portion. In decision block 702, if the untrusted code retrieved the ancestor transaction, then the component continues at block 703, else the component continues at block 704. In block 703, the component decrypts the encrypted ancestor transaction using the private key of the enclave and then completes, indicating the ancestor transaction. In block 704, the component sends to another enclave the request for the ancestor transaction. In decision block 705, if the ancestor transaction was retrieved, then the component completes, indicating the ancestor transaction, else the component completes, indicating that the ancestor transaction was not retrieved.

Figure 8:
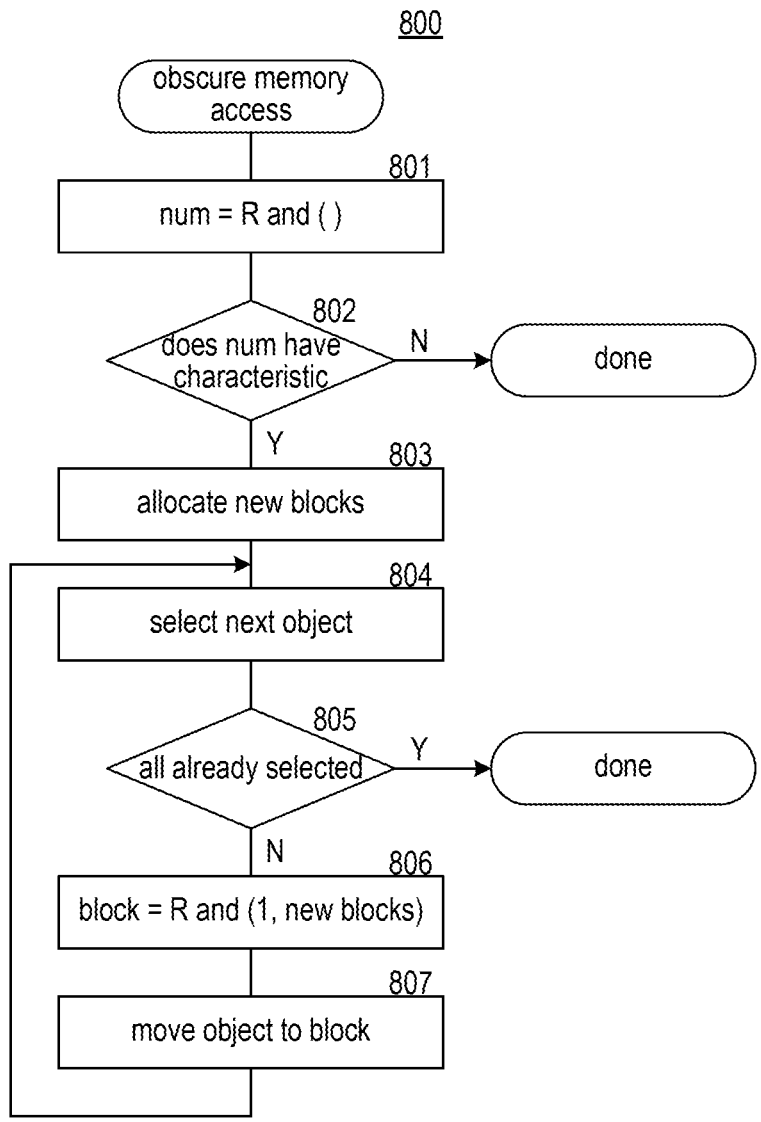
FIG. 8 is a flow diagram that illustrates example processing of an obscure memory access component of enclave code in some embodiments.

FIG. 8 is a flow diagram that illustrates example processing of an obscure memory access component of enclave code in some embodiments. The obscure memory access component 800 may be invoked periodically to at random times rearrange enclave memory in a random manner. In block 801, the component retrieves a random number. In decision block 802, if the random number satisfies a certain characteristic (e.g., greater than a certain threshold), then it is time to rearrange enclave memory and the component continues at block 803 to rearrange enclave memory, else the component completes. In block 803, the component allocates new blocks for storage of existing objects. In blocks 804-807, the component loops, moving objects to locations within the new blocks. In block 804, the component selects the next object. In decision block 805, if all the objects have already been selected, then the component completes, else the component continues at block 806. In block 806, the component randomly identifies a block for storing the selected object. In block 807, the component moves the object to the identified block and then loops to block 804 to select the next object and adjusts references to the object to point to the moved object.

Figure 9:
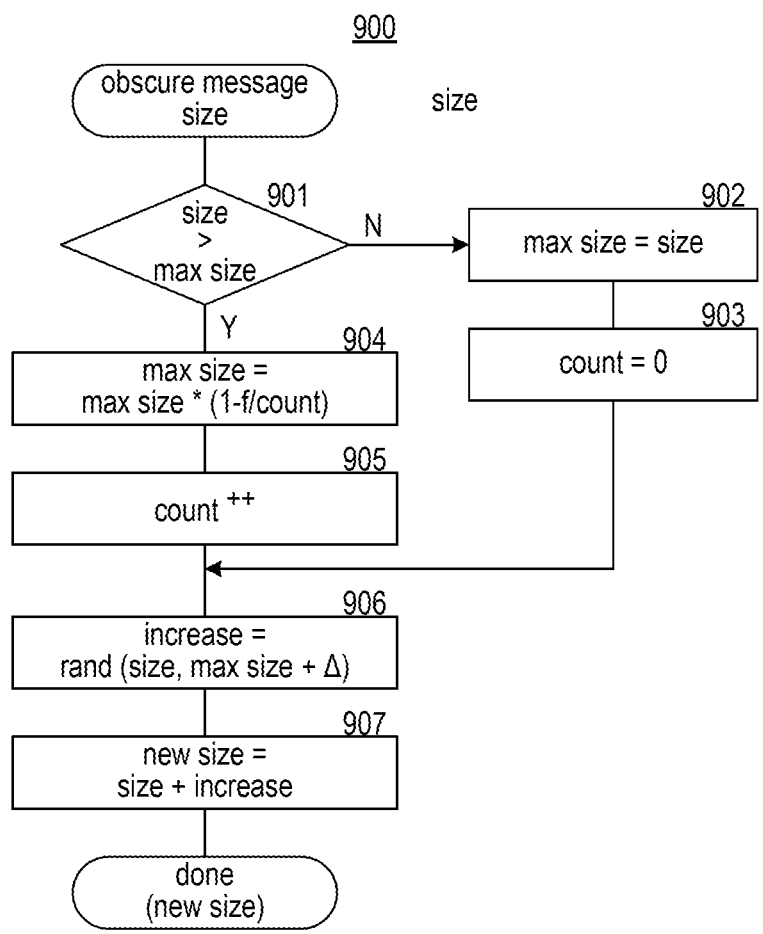
FIG. 9 is a flow diagram that illustrates processing of an obscure message size component of enclave code in some embodiments.

FIG. 9 is a flow diagram that illustrates processing of an obscure message size component of enclave code in some embodiments. The obscure message size component 900 is invoked, passing an indication of the message size, and generates a new message size. In decision block 901, if the message size is greater than a maximum message size, then the component continues at block 902, else the component continues at block 904. In block 902, the component sets the maximum message size to the message size. In block 903, the component sets a count to zero and continues at block 906. The count indicates how many messages have been sent since the message of the maximum message size. The component may reduce the maximum message size so that an isolated large message will not result in all subsequent messages having their message size adjusted to a much larger size based on the size of that isolated large message, which may be an aberration. In block 904, the component reduces the maximum message size based on some function (e.g., logarithmic function) of the count of messages processed that are smaller than the current maximum message size. In block 905, the component increments the count. In block 906, the component calculates an increase in the message size of the message based on a random selection between the size of the message and the maximum message size plus a delta. In some embodiments, the component may also split a message into multiple messages to further obscure the message sizes. In block 907, the component sets a new size for the message to the message size plus the increase and then completes with an indication of the new message size. When the message is sent, it may be padded with random data to fill out the new message size.

Description of Deterministic JVM

The distributed ledger system helps ensure that all nodes that process a transaction agree on whether it is valid or not. Because transaction types are defined using bytecodes (e.g., of a JVM), the execution of the bytecodes should be fully deterministic. Standard virtual machines, such as a JVM, may not be fully deterministic. To ensure that the execution of the bytecodes is deterministic, the protocol framework includes a rewrite contract code component that modifies contract code to ensure that it executes deterministically. Table 1 illustrates example possible sources of non-determinism.

TABLE 1

Sources of external input (e.g., the file system, network, system properties, and clocks)
Random number generators
Different decisions about when to terminate long-running programs
Object.hashCode( )
Differences in hardware floating-point arithmetic operations
Multi-threading
Differences in API implementations between nodes
Garbage collector callbacks To ensure that contract code is fully pure (i.e., deterministic and with no side effects), the distributed ledger system employs a new type of JVM sandbox. The distributed ledger system may rewrite the bytecode based on a static analysis of the bytecode and modify the JVM to control the behavior of hash code generation and invocation of non-deterministic functions. The rewrite contract code component may rewrite the bytecode of a contract code before it is first executed and store the rewritten bytecode for future executions. Table 2 illustrates example tasks performed during the rewriting of the bytecode.

TABLE 2

Inserts calls to an accounting object before expensive bytecodes
Prevents exception handlers from catching certain exceptions (e.g., Throwable, Error, or ThreadDeath)
Adjusts constant pool references to relink the code against a "shadow" runtime library (e.g., JDK)
Directs the use of hardware-independent floating-point operations
Forbids dynamic invocation (e.g., invokedynamic bytecodes), native methods, and finalizers The rewrite contract code component instruments the contract code by inserting calls to an accounting object to deterministically terminate code that has run for an unacceptable amount of time or used an unacceptable amount of memory. The accounting object checks a termination criterion to determine whether to terminate the execution of the contract code. For example, the accounting object may determine an accumulated cost of execution (e.g., based on number and types of bytecodes executed and memory used). The termination criterion may specify that execution of the contract code should terminate when an accumulated cost threshold is reached. Because execution of the contract code is deterministic, given the same input, every execution of the contract code will terminate at the same point—that is, when the termination criterion is satisfied or when execution terminates normally. Particularly expensive bytecodes may include method invocation, allocations, backwards jumps, throwing of exceptions, and so on. The rewrite contract code also instruments code that can be transitively reached from the contract code. For example, the shadow runtime library may be instrumented prior to execution of any contract code.

The rewrite contract code component may assess the cost of execution by counting bytecodes that are known to be expensive to execute. Since the size of a method is limited and jumps count towards the cost, the assessment of cost will eventually terminate. However, it is still possible to construct bytecode sequences that take excessive amounts of time to execute even though they do not use expensive operations. For example, contract code with very nested method calls in which the most-nested methods perform inexpensive bytecodes may accumulate to be expensive. The instrumentation of the contract code ensures that infinite loops are terminated and that if the cost of verifying a transaction becomes unexpectedly large (e.g., contains algorithms with complexity exponential in transaction size), all nodes agree precisely on when to terminate. The instrumentation may not provide protection against denial of service attacks. If a node receives transactions that appear designed to simply waste CPU time of the node, then the node can block the sending node.

In some embodiments, because instrumentation may be a high overhead, the rewrite contract code component may statically calculate bytecode costs as much as possible ahead of time and instrument only the entry point of "accounting blocks" such as runs of basic blocks that end with either a method return or a backwards jump. Because only an abstract cost (e.g., a general sense of the magnitude of the cost) matters and because the limits are expected to be set relatively high, the rewrite contract code component need not instrument every basic block. For example, the rewrite contract code component may use the maximum of the cost of the "then" block and the cost of the "else" block of an if-then-else statement when neither block contains a backwards jump. In such a case, the rewrite contract code need only instrument before the if-then-else statement and need not instrument the blocks.

The shadow runtime library duplicates a subset of the standard runtime library, but inside a dedicated sandbox package. The shadow runtime library may omit functionality that contract code is not permitted to access, such as file I/O or external entropy (e.g., such as a random number generator).

In some embodiments, the rewrite contract code component may direct the use of hardware-independent floating-point operations by setting the strictfp flag on every method of the contract code and of code that is transitively called.

In some embodiments, the rewrite contract code component may prohibit finalizers in contract code because finalizers have been known to be implemented non-deterministically. The rewrite contract code component may prohibit calls via a Java Native Interface because the called application may behave non-deterministically. The rewrite contract code component may prohibit the invokedynamic bytecode because libraries supporting the invokedynamic bytecode have been known to have security problems.

In some embodiments, the JVM sandbox may impose a quota on bytes allocated rather than bytes retained. If contract code allocates and quickly deallocates large numbers of bytes (resulting in a small heap size), a quota based on bytes allocated may unnecessarily penalize such contract code. Alternatively, the JVM sandbox may employ a garbage collector to identify the heap size and impose a quota based on heap size.

The Object.hashCode( ) function is typically implemented either by returning a pointer address or by assigning the object a random number and thus can result in different iteration orders over hash maps and hash sets. To prevent this non-deterministic behavior, the distributed ledger system may modify calls to the Object.hashCode( ) function with new Java Native Interface ("JNI") calls that reseed the JVM's thread local random number generator before execution begins. The seed may be derived from the hash of the transaction being verified to ensure that all verifications of the transaction use the same seed and thus the same hash code.

The following paragraphs describe various embodiments of aspects of the SDL system. An implementation of the SDL system may employ any combination of the embodiments. The processing described below may be performed by a computing device with a processor that executes computer-executable instructions stored on a computer-readable storage medium that implements the SDL system.

In some embodiments, a method performed by a computing system during execution of trusted code within a secure enclave of a computing system is provided for ensuring privacy of transactions. The method receives an indication of a transaction. The method validates the transaction. The method encrypts the validated transaction using an encryption key of the trusted code. The method requests untrusted code of the computing system to store the encrypted validated transaction in a portion of a data store. The untrusted code cannot decrypt the encrypted validated transaction that is stored in the data store. In some embodiments, the method further requests the untrusted code to provide the encrypted validated transaction to the trusted code. Th method, upon being provided the encrypted validated transaction, decrypts the encrypted validated transaction using a decryption key of the trusted code that corresponds to the encryption key. In some embodiments, the request to provide the encrypted validated transaction is in response to receiving a request to validate another transaction. In some embodiments, the method further receives a request from other trusted code of a secure enclave of another computing system to provide the transaction, wherein the request to provide the transaction is in response to receiving the request from the other trusted code. In some embodiments, the other trusted code sends the request to provide the transaction during validation of another transaction. In some embodiments, the method further encrypts the decrypted validated transaction using a send encryption key and sending the encrypted decrypted transaction to the other trusted code so that the other trusted code can decrypt the encrypted decrypted transaction using a send decryption key corresponding to the send encryption key. In some embodiments, the send encryption key and send decryption key are a symmetric keypair. In some embodiments, the send encryption key and the send decryption key are a public/private keypair. In some embodiments, the trusted code and the other trusted code establish a secure connection and wherein the encrypted, decrypted validated transaction is sent via the secure connection. In some embodiments, the transaction includes an input state that is an output state of another transaction wherein the validating of the transaction includes requesting the untrusted code to provide the other transaction and receiving an encrypted form of the other transaction. In some embodiments, the untrusted code retrieves the encrypted form of the other transaction from the data store and provides the encrypted form to the trusted code and the trusted code decrypts the encrypted form. In some embodiments, the method further receives from the untrusted code an indication that the transaction is not stored in the data store and requests other trusted code of a secure enclave of another computing device to provide the transaction wherein the encrypted form of the other transaction is provided by from the other code. In some embodiments, the encryption key is a private key of a public/private keypair. In some embodiments, the transaction has an output state and the method further sends the output state to the untrusted code.

In some embodiments, a method performed by a computing system during execution of untrusted code is provided for supporting secure storage of transactions. The computing system is a node that maintains a portion of a sealed distributed ledger. The method receives an encrypted transaction from trusted code of a secure enclave of the computing system. The encrypted transaction is encrypted with an encryption key of the trusted code. The method stores the encrypted transaction in the portion of the sealed distributed ledger. The method receives from the trusted code a request for the encrypted transaction. The method retrieves the encrypted transaction from the portion of the sealed distributed ledger. The method provides the encrypted transaction to the trusted code. In some embodiments, the method further receives from the trusted code a request for another transaction and, when the other transaction is not stored in the portion of the sealed distributed ledger, notifies the trusted code that the other transaction is not stored in the portion of the sealed distributed ledger. The trusted code requests other trusted code of a secure enclave of another node to provide the other transaction.

In some embodiments, a method performed by trusted code of a secure enclave of a computing system is provided for providing evidence that a transaction has been validated. The method receives and validates transaction. The method generates an attestation that the transaction has been validated. The attestation is evidence that the transaction is valid and being signed using a private key of a public/private keypair of the secure enclave. The method provides the attestation to untrusted code for use in validating another transaction that inputs output state of the transaction. In some embodiments, the untrusted code sends the other transaction, the attestation, and the output state to other trusted code of a secure enclave of another computing system so that the other trusted code can validate the other transaction. In some embodiments, the other trusted code relies on the attestation as evidence that the transaction is valid and does not need to validate the transaction or its ancestor transactions, if any. In some embodiments, the attestation is part of a signature of attestation. In some embodiments, the attestation includes a hash of the transaction. In some embodiments, the computing system is a node that maintains a portion of a sealed distributed ledger and the method further encrypts the transaction using an encryption key and provides to untrusted code of the computing system the encrypted transaction for storage in the portion of the sealed distributed ledger. In some embodiments, the attestation includes a hash of the trusted code signed using an encryption key of the secure enclave.

In some embodiments, a method performed by trusted code of a secure enclave of a computing system is provided for validating a transaction that inputs an output state of another transaction. The method receives the transaction. The method requests untrusted code of the computing system to provide the other transaction. The method receives from the untrusted code a signature of attestation for the other transaction. The signature of attestation generated by a secure enclave as evidence of validity of the other transaction. The method verifies that the signature of attestation is by a secure enclave that executes trusted code for the other transaction. The method coordinates with a notary to determine whether the output state of the other transaction has been consumed. The method indicates that the transaction is valid when the signature of attestation is verified, the output state is not consumed, and any other criterion for validity is satisfied. In some embodiments, the method generates a signature of attestation indicating that the transaction is valid. In some embodiments, the method further provides the signature of attestation to untrusted code.

In some embodiments, a method performed by a computing system is provided for obscuring a memory access pattern of target code of a secure enclave of the computing system. The method executes the target code of the secure enclave that accesses data stored at locations in memory of the computing system. Each memory access for data including a reference to the location at which the data is stored. When an obscure criterion is satisfied, the method executes obscuring code of the secure enclave that rearranges data that is stored in memory so that the rearranged data is stored at new locations that are different from the locations before rearranging and adjusts references to the rearranged data to refer to the new locations so that the target code accesses the rearranged data based on the adjusted references. In some embodiments, the obscuring code executes during garbage collection of the data. In some embodiments, the obscuring code executes at randomized times. In some embodiments, the rearranging is based on a randomization. In some embodiments, a virtual machine of the secure enclave executes the target code. In some embodiments, the obscuring code is executed by a garbage collector of the virtual machine. In some embodiments, the virtual machine is a Java virtual machine. In some embodiments, the virtual machine maintains translation information to translate target references used by the target code and virtual machine references used by the virtual machine to access the locations in memory. In some embodiments, the virtual machine references are virtual addresses that are mapped to physical addresses when accessing data. In some embodiments, the adjusting adjusts the virtual machine references.

In some embodiments, a method performed by a computing system is provided for obscuring message sizes of messages of target code executing in a secure enclave of the computing system. The method executes the target code that requests to send messages having original message sizes. When the target code requests to send a message, the method executes obscuring code of the secure enclave that adjusts the original message size of the message to an adjusted message size and sends the message as part of a message having the adjusted message size. In some embodiments, the adjusted message size is larger than the original message size. In some embodiments, the adjusted message size is larger by an amount that is based on a randomization. In some embodiments, the amount is based on a maximum message size. In some embodiments, the maximum message size is reduced based on the original message sizes of previously sent messages. In some embodiments, the amount is based on a maximum message size of messages previously sent. In some embodiments, the adjusting of the original message size splits the message into multiple messages with each of the multiple messages having a split message size and the sending sends the multiple messages. The method further executes code that, when a message with an adjusted message size is received from a secure enclave of another computing system, sets the message size of the received message to an original message size. In some embodiments, the message includes the original message size. In some embodiments, the method further executes code that, when multiple split messages of a sent message are received from a secure enclave of another computing system, combines the split messages into the sent message having an original message size of the sent message.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, when trusted code of a node encrypts transactions for storage in the portion of the SDL stored at the node, the trusted code may use a symmetric key (i.e., that functions as both the encryption key and decryption key) rather than a public/private keypair. Accordingly, the invention is not limited except as by the appended claims.

The invention claimed is:

1. A method performed by a computing system during execution of trusted code of a secure enclave of the computing system for ensuring privacy of transactions, the method comprising:
receiving an indication of a transaction;
validating the transaction;
encrypting the validated transaction using an encryption key of the trusted code;
requesting untrusted code of the computing system to store the encrypted validated transaction in a portion of a data store wherein the untrusted code cannot decrypt the encrypted validated transaction that is stored in the data store;
receiving a request from other trusted code of a secure enclave of another computing system to provide the transaction; and
in response to receiving the request from the other trusted code,
requesting the untrusted code to provide the encrypted validated transaction to the trusted code; and
upon being provided the encrypted validated transaction, decrypting the encrypted validated transaction using a decryption key of the trusted code that corresponds to the encryption key.

2. The method of claim 1 wherein the other trusted code sends the request to provide the transaction during validation of another transaction.

3. The method of claim 1 further comprising encrypting the decrypted validated transaction using a send encryption key and sending the encrypted validated transaction to the other trusted code so that the other trusted code can decrypt the encrypted validated transaction using a send decryption key corresponding to the send encryption key.

4. The method of claim 3 wherein the send encryption key and the send decryption key are a symmetric keypair.

5. The method of claim 3 wherein the send encryption key and the send decryption key are a public/private keypair.

6. The method of claim 3 wherein the trusted code and the other trusted code establish a secure connection and wherein the encrypted validated transaction is sent via the secure connection.

7. A method performed by a computing system during execution of trusted code within a secure enclave of the computing system for ensuring privacy of transactions, the method comprising:
receiving an indication of a transaction;
validating the transaction;
encrypting the validated transaction using an encryption key of the trusted code; and
requesting untrusted code of the computing system to store the encrypted validated transaction in a portion of a data store;
wherein the untrusted code cannot decrypt the encrypted validated transaction that is stored in the data store,
wherein the transaction includes an input state that is an output state of another transaction,
wherein the validating of the transaction comprises:
requesting the untrusted code to provide the other transaction; and
receiving an encrypted form of the other transaction, and
wherein the untrusted code retrieves the encrypted form of the other transaction from the data store and provides the encrypted form to the trusted code, and the trusted code decrypts the encrypted form.

8. A method performed by a computing system during execution of trusted code of a secure enclave of the computing system for ensuring privacy of transactions, the method comprising:
receiving an indication of a transaction;
validating the transaction;
encrypting the validated transaction using an encryption key of the trusted code; and
requesting untrusted code of the computing system to store the encrypted validated transaction in a portion of a data store;
wherein the untrusted code cannot decrypt the encrypted validated transaction that is stored in the data store,
wherein the transaction includes an input state that is an output state of another transaction, and
wherein the validating of the transaction comprises:
requesting the untrusted code to provide the other transaction;
receiving from the untrusted code an indication that the other transaction is not stored in the data store; and
requesting other trusted code of a secure enclave of another computing system to provide the other transaction, wherein an encrypted form of the other transaction is provided by the other trusted code.

9. The method of claim 8 wherein the encryption key is a private key of a public/private keypair.

10. The method of claim 8 wherein the transaction has an output state and further comprising sending the output state to the untrusted code.

11. A method performed by a computing system during execution of untrusted code for supporting secure storage of transactions, the computing system being a node that maintains a portion of a sealed distributed ledger, the method comprising:

receiving an encrypted transaction from trusted code of a secure enclave of the computing system, the encrypted transaction encrypted with an encryption key of the trusted code;

storing the encrypted transaction in the portion of the sealed distributed ledger;

receiving from the trusted code a request for the encrypted transaction;

retrieving the encrypted transaction from the portion of the sealed distributed ledger;

providing the encrypted transaction to the trusted code;

receiving from the trusted code a request for another transaction; and when the other transaction is not stored in the portion of the sealed distributed ledger, notifying the trusted code that the other transaction is not stored in the portion of the sealed distributed ledger;

wherein the trusted code requests other trusted code of a secure enclave of another node to provide the other transaction.

12. One or more computing systems that, during execution of trusted code within a secure enclave of the one or more computing systems, ensure privacy of transactions, the one or more computing systems comprising:

one or more computer-readable storage mediums storing computer-executable instructions for controlling the one or more computing systems to:
encrypt a validated transaction using an encryption key of the trusted code;
request untrusted code of the one or more computing systems to store the encrypted validated transaction in a portion of a data store, wherein the untrusted code cannot decrypt the encrypted validated transaction;
receive a request from other trusted code of a secure enclave of another computing system to provide the transaction;
in response to receiving the request from the other trusted code, request the untrusted code to provide the encrypted validated transaction to the trusted code; and
upon being provided the encrypted validated transaction, decrypt the encrypted validated transaction using a decryption key of the trusted code that corresponds to the encryption key; and
one or more processors for executing the computer-executable instructions stored in the one or more computer-readable storage mediums.

13. The one or more computing systems of claim 12 wherein the other trusted code sends the request to provide the transaction during validation of another transaction.

14. One or more computing systems that, during execution of trusted code within a secure enclave of the one or more computing systems, ensure privacy of transactions, the one or more computing systems comprising:

one or more computer-readable storage mediums storing computer-executable instructions for controlling the one or more computing systems to:
encrypt a validated transaction using an encryption key of the trusted code;
request untrusted code of the one or more computing systems to store the encrypted validated transaction in a portion of a data store, wherein the untrusted code cannot decrypt the encrypted validated transaction that is stored in the data store;
encrypt the validated transaction using a send encryption key; and
send the encrypted validated transaction to other trusted code so that the other trusted code can decrypt the encrypted validated transaction using a send decryption key corresponding to the send encryption key; and
one or more processors for executing the computer-executable instructions stored in the one or more computer-readable storage mediums.

15. The one or more computing systems of claim 14 wherein the trusted code and the other trusted code establish a secure connection and wherein the encrypted validated transaction is sent via the secure connection.

16. One or more computing systems that, during execution of trusted code within a secure enclave of the one or more computing systems, ensure privacy of transactions, the one or more computing systems comprising:

one or more computer-readable storage mediums storing computer-executable instructions for controlling the one or more computing systems to:
validate a transaction that includes an input state that is an output state of another transaction, the validating including:
requesting untrusted code to provide the other transaction,
receiving an encrypted form of the other transaction wherein the untrusted code retrieves the encrypted form of the other transaction from a data store, and decrypting the encrypted form of the other transaction;
encrypt the validated transaction using an encryption key of the trusted code; and
request the untrusted code to store the encrypted validated transaction in the data store, wherein the untrusted code cannot decrypt the encrypted validated transaction that is stored in the data store; and
one or more processors for executing the computer-executable instructions stored in the one or more computer-readable storage mediums.

17. One or more computing systems that, during execution of trusted code within a secure enclave of the one or more computing systems, ensure privacy of transactions, the one or more computing systems comprising:

one or more computer-readable storage mediums storing computer-executable instructions for controlling the one or more computing systems to:
validate a transaction that includes an input state that is an output state of another transaction, the validating including:
requesting untrusted code to provide the other transaction,
receiving from the untrusted code an indication that the other transaction is not stored in a data store,
requesting other trusted code of a secure enclave of another computing system to provide the other transaction, wherein an encrypted form of the other transaction is provided by the other trusted code, and
receiving the encrypted form of the other transaction;
encrypt the validated transaction using an encryption key of the trusted code; and
request the untrusted code to store the encrypted validated transaction in the data store, wherein the untrusted code cannot decrypt the encrypted validated transaction that is stored in the data store; and
one or more processors for executing the computer-executable instructions stored in the one or more computer-readable storage mediums.

18. One or more computer-readable storage mediums storing computer-executable instructions that, during execution of trusted code within a secure enclave of one or more computing systems, ensure privacy of transactions, the computer-executable instructions including instructions to:
- encrypt a validated transaction using an encryption key of the trusted code;
- request untrusted code of the one or more computing systems to store the encrypted validated transaction in a data store, wherein the untrusted code cannot decrypt the encrypted validated transaction that is stored in the data store;
- receive a request from other trusted code of a secure enclave of another computing system to provide the transaction; and
- in response to receiving the request from the other trusted code,
    - request the untrusted code to provide the encrypted validated transaction to the trusted code; and
    - upon being provided the encrypted validated transaction, decrypt the encrypted validated transaction using a decryption key of the trusted code that corresponds to the encryption key.

19. The one or more computer-readable storage mediums of claim 18 wherein the other trusted code sends the request to provide the transaction during validation of another transaction.

20. One or more computer-readable storage mediums storing computer-executable instructions that, during execution of trusted code within a secure enclave of one or more computing systems, ensure privacy of transactions, the computer-executable instructions including instructions to:
- encrypt a validated transaction using an encryption key of the trusted code;
- request untrusted code of the one or more computing systems to store the encrypted validated transaction in a portion of a data store, wherein the untrusted code cannot decrypt the encrypted validated transaction that is stored in the data store;
- encrypt the validated transaction using a send encryption key; and
- send the encrypted validated transaction to other trusted code so that the other trusted code can decrypt the encrypted validated transaction using a send decryption key corresponding to the send encryption key.

21. The one or more computer-readable storage mediums of claim 20 wherein the trusted code and the other trusted code establish a secure connection and wherein the encrypted validated transaction is sent via the secure connection.

22. One or more computer-readable storage mediums storing computer-executable instructions that, during execution of trusted code within a secure enclave of a computing system, ensure privacy of transactions, the computer-executable instructions comprising instructions that:
- validate a transaction that includes an input state that is an output state of another transaction, the validating including:
    - requesting untrusted code to provide the other transaction,
    - receiving an encrypted form of the other transaction, wherein the untrusted code retrieves the encrypted form of the other transaction from a portion of a data store, and
    - decrypting the encrypted form of the other transaction;
- encrypt the validated transaction using an encryption key of the trusted code; and
- request the untrusted code to store the encrypted validated transaction in another portion of the data store, wherein the untrusted code cannot decrypt the encrypted validated transaction that is stored in the other portion of the data store.

23. One or more computer-readable storage mediums storing computer-executable instructions that, during execution of trusted code within a secure enclave of a computing system, ensure privacy of transactions, the computer-executable instructions comprising instructions that:
- validate a transaction that includes an input state that is an output state of another transaction, the validating including:
    - requesting untrusted code to provide the other transaction;
    - receiving from the untrusted code an indication that the other transaction is not stored in a portion of the data store;
    - requesting other trusted code of a secure enclave of another computing system to provide the other transaction, wherein an encrypted form of the other transaction is stored in another portion of the data store and is provided by the other trusted code; and
    - receiving the encrypted form of the other transaction;
- encrypt the validated transaction using an encryption key of the trusted code; and
- request the untrusted code to store the encrypted validated transaction in the portion of the data store, wherein the untrusted code cannot decrypt the encrypted validated transaction that is stored in the portion of the data store.

\* \* \* \* \*

UNITED STATES PATENT AND TRADEMARK OFFICE
CERTIFICATE OF CORRECTION

PATENT NO. : 11,362,807 B2
APPLICATION NO. : 16/540824
DATED : June 14, 2022
INVENTOR(S) : Michael Christopher Hearn Page 1 of 1

It is certified that error appears in the above-identified patent and that said Letters Patent is hereby corrected as shown below:

In the Specification

In Column 6, Line 2, delete "$K_{pub}^{E_S}$" and insert -- $K_{pub}^{E_B}$ --.

In Column 6, Line 19, delete "TX$_1$" and insert -- Tx$_1$ --.

In Column 6, Line 30, delete "$Tx_{pub}^{E_B}(Tx_1)$" and insert -- $K_{pub}^{E_B}(Tx_1)$ --.

In Column 6, Line 53, delete "$K_{pub}^{E_B}(TX_1)$" and insert -- $K_{pub}^{E_B}(Tx_1)$ --.

In Column 7, Line 30, delete "SK ." and insert -- SK. --.

In Column 8, Line 43, delete "SoA (Tx$_2$)" and insert -- SoA(Tx$_2$) --.

Signed and Sealed this
Twenty-fifth Day of April, 2023

Katherine Kelly Vidal

Katherine Kelly Vidal
*Director of the United States Patent and Trademark Office*